Dec. 8, 1925.  1,564,392
J. H. WILLIAMS
MECHANISM FOR TEACHING PIANO
Filed Feb. 1, 1924  4 Sheets-Sheet 1

Joseph H. Williams.
INVENTOR
BY Victor J. Evans
ATTORNEY

WITNESSES

Dec. 8, 1925.

J. H. WILLIAMS

MECHANISM FOR TEACHING PIANO

Filed Feb. 1, 1924

Dec. 8, 1925.                                                    1,564,392
J. H. WILLIAMS
MECHANISM FOR TEACHING PIANO
Filed Feb. 1, 1924          4 Sheets-Sheet 3
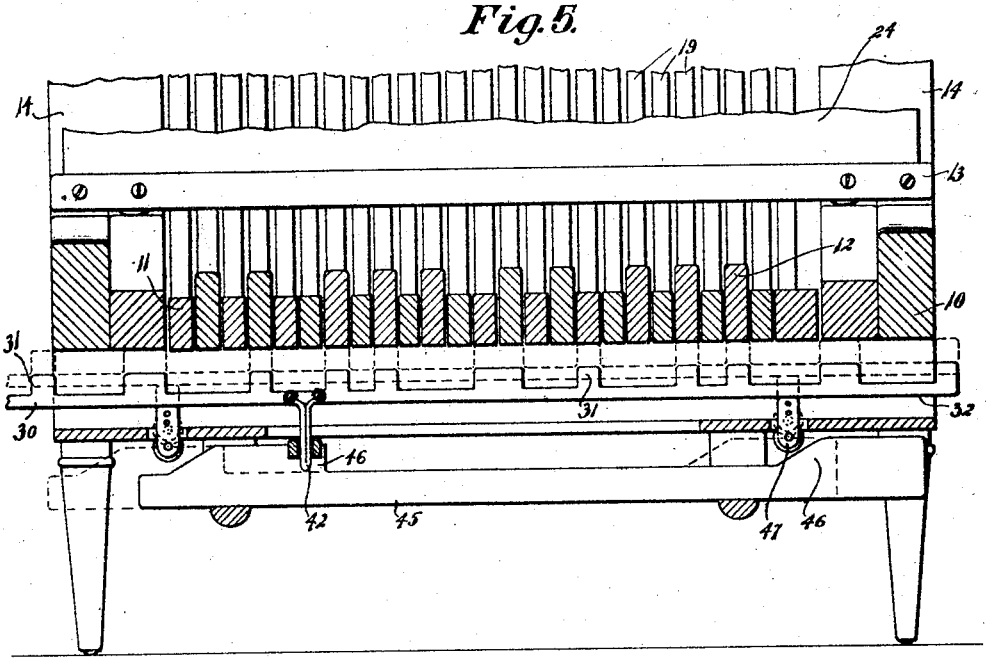
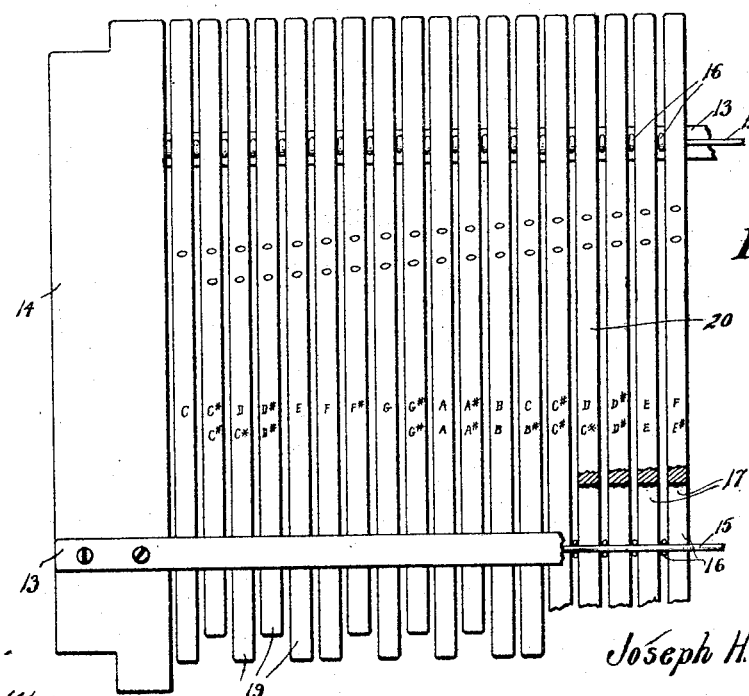
Inventor
Joseph H. Williams.
By Victor J. Evans
Attorney
WITNESSES Dec. 8, 1925.  
J. H. WILLIAMS  
MECHANISM FOR TEACHING PIANO  
Filed Feb. 1, 1924   4 Sheets-Sheet 4
1,564,392
Fig. 7.
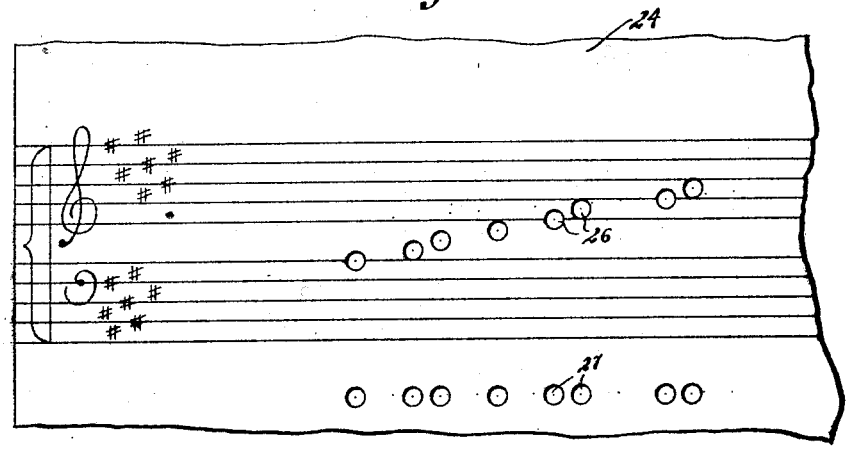
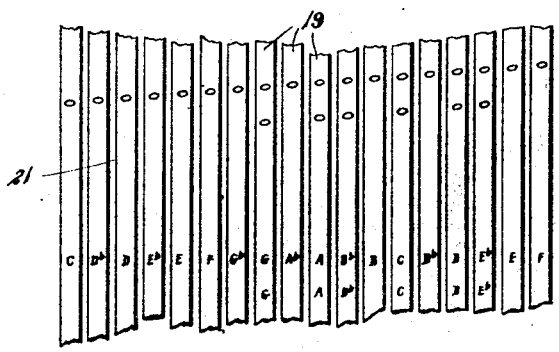
Fig. 8.
Fig. 9.
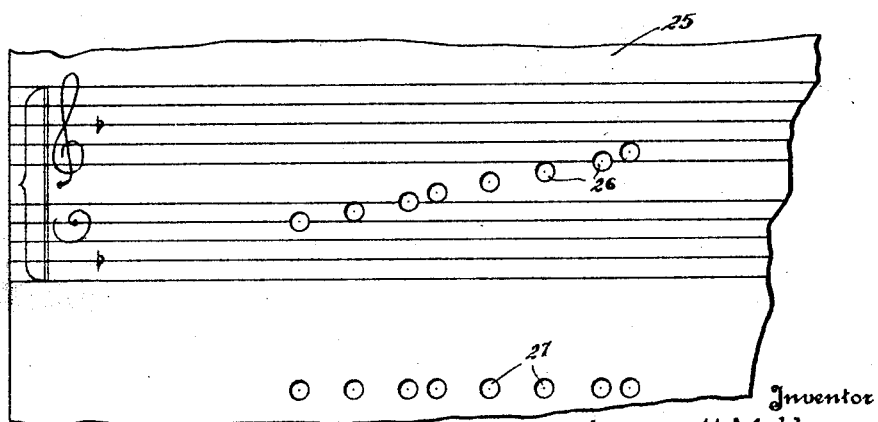
WITNESSES
Inventor  
Joseph H. Williams.  
By Victor J. Evans  
Attorney Patented Dec. 8, 1925.

1,564,392

UNITED STATES PATENT OFFICE.

JOSEPH H. WILLIAMS, OF INDEPENDENCE, KANSAS.

MECHANISM FOR TEACHING PIANO.

Application filed February 1, 1924. Serial No. 689,951.

*To all whom it may concern:*

Be it known that I, JOSEPH H. WILLIAMS, a citizen of the United States, residing at Independence, in the county of Montgomery and State of Kansas, have invented new and useful Improvements in Mechanism for Teaching Piano, of which the following is a specification.

This invention relates to a new and improved means for teaching music and has for an object the provision of simple and efficient means for teaching the names of the keys of a piano and the position upon the staff of the note corresponding to the particular key played.

Another object of the invention is the provision of means for indicating the name of each piano key as the key is operated and to simultaneously locate the key note upon the staff so that the student will easily and quickly learn the names of the keys and the position upon the staff of the note played.

Another object of the invention is the provision of means for selectively locking the piano keys so that only certain of the keys may be played, so that the student may easily and readily learn various finger exercises.

With the above and other objects in view, the invention further includes the following novel features and details of construction, to be hereinafter more fully described, illustrated in the accompanying drawings and pointed out in the appended claims.

In the drawings:

Figure 5 is a longitudinal section showing by dotted lines the position of one of the key locking bars when the latter is in locking position.

Figure 6 is a fragmentary elevation showing a portion of the sharp side of a number of indicator bars.

Figure 7 is a similar view of one of the sharp charts.

Figure 8 is a fragmentary elevation showing the flat side of a number of indicator bars.

Figure 9 is a similar view of one of the flat charts.

Figure 1:
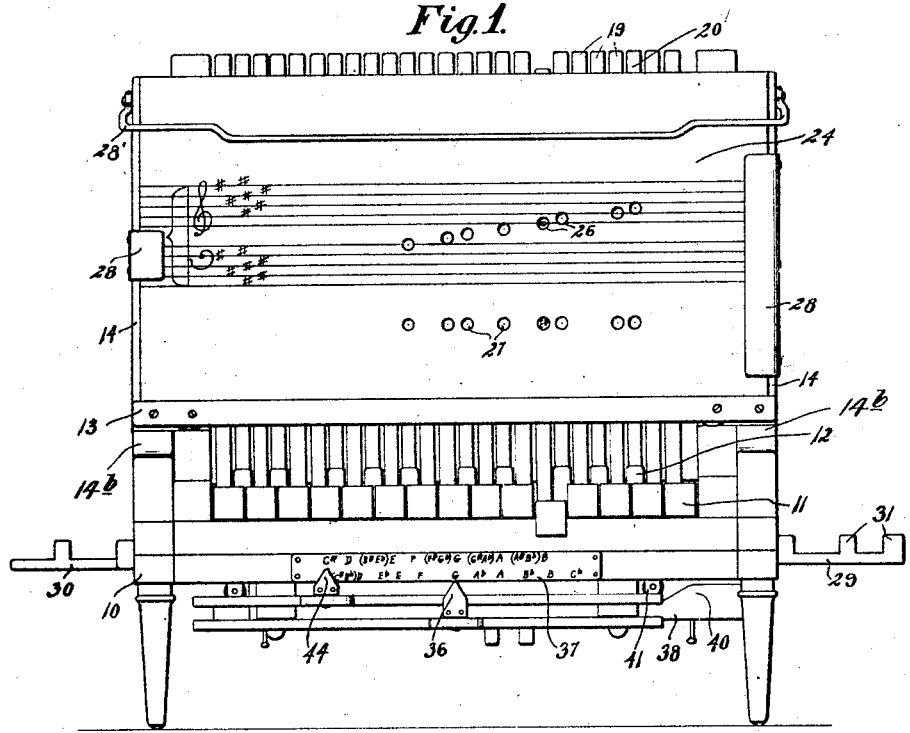
Figure 1 is an elevation of a portion of a piano with parts removed and the invention applied, one of the keys being depressed.
Figure 2:
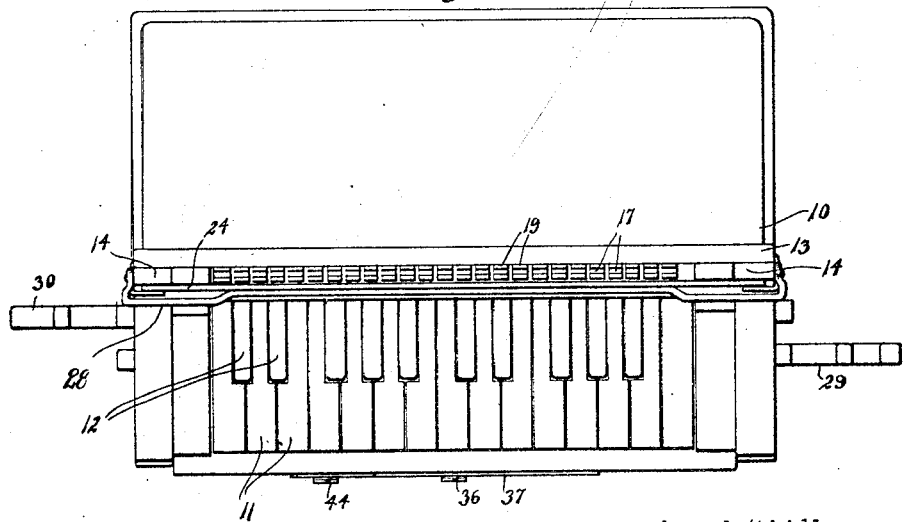
Figure 2 is a plan view.
Figure 3:
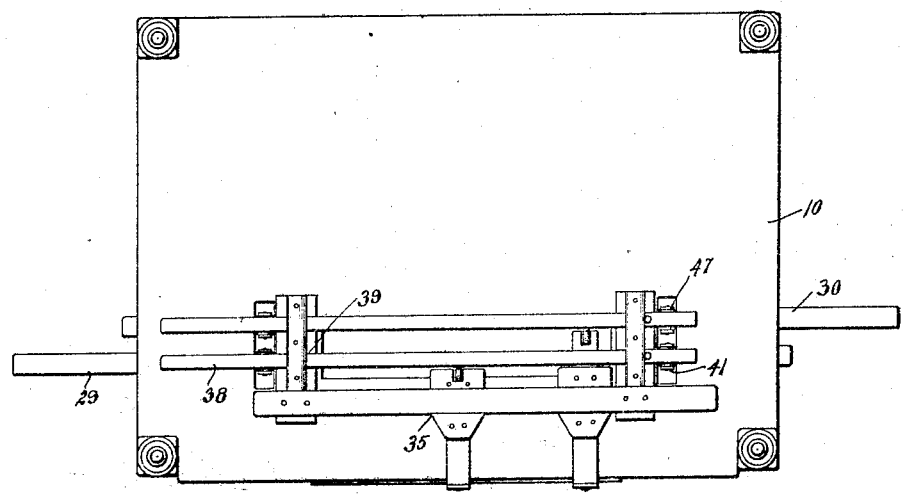
Figure 3 is a bottom plan view.
Figure 4:
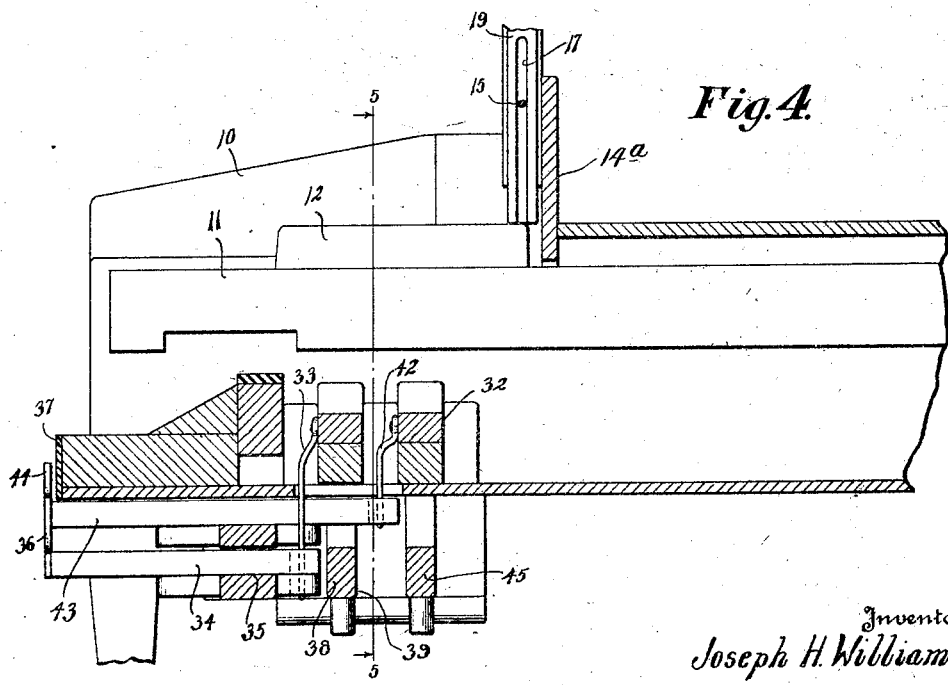
Figure 4 is a transverse sectional view.

Referring to the drawings in detail whereas in like characters of reference denote corresponding parts, the reference character 10 indicates a portion of a piano structure, 11 the white keys and 12 the black keys and while only a few of the keys are illustrated it may be here stated that the invention is capable of use with a limited number of keys or with the entire set of keys of an 88 note piano.

Positioned above the keys is an indicator which includes a frame having upper and lower longitudinally disposed bars 13 and end connecting bars 14, the latter being connected by upper and lower rods 15. These rods pass through spaced eyes 16 which extend from the bars 13 and also through longitudinally disposed slots 17 provided in the opposite ends of indicator strips 19, one of these strips being provided for each of the keys. The frame is arranged so that the ends of the strips rest upon the keys and when the latter are played the strips will move vertically through the action of the keys.

These strips contain indicia upon their opposite sides, one side 20 being arranged for use when playing sharps and the opposite side 21 when playing flats. For this purpose the sharp side 20 will contain indicia such as C natural, C sharp, A natural, A sharp and so forth, while above this indicia is arranged other indicia 22 such as is used in indicating notes upon a music staff.

The opposite or flat side 21 of the indicator contains indicia such as C natural, D flat, D natural, E flat and so forth and above, as upon the opposite side of the indicator, indicia 23 such as is used to indicate notes upon the staff.

The lower ends of the connecting bars 14 of the indicator frame rest between a rigid strip 14$^a$ carried by the piano and extending horizontally across the back of the frame, and blocks 14$^b$ which extend upwardly at each end of the piano. The indicator frame is thus supported in a manner to permit of its being reversed, it being simply necessary to lift the frame from its supporting means and reverse and replace said frame.

Co-operating with the indicia upon the sharp side of the indicator is a plurality of charts, one of which is indicated at 24, while a plurality of charts is also provided for use upon the flat side 21 of the indicator, one of the flat charts being indicated at 25. The charts 24 and 25 are provided with both clefs of the music staff and have openings 26 arranged upon the staff representing a scale. The chart 24 represents the scale of A sharp minor and is designed to be placed upon the indicator in front of the strips 19 so that when the keys of the piano are played, the position upon the scale of the note sounded will be indicated. This is effected by the movement of the particular indicator strip for the key played, the movement of the strip positioning one of the end representations 21 within one of the openings. In addition, the charts 24 and 25 are provided with a row of openings 27 which are spaced below the staff and arranged so that the name of the note, which is also the name of the key of the piano will appear within the opening directly beneath the opening through which the note 21 is seen. Thus, by simultaneously exposing the name of the note and the name of the piano key, together with the position of the note upon the staff, the student will associate this name and position with the particular key struck so that this information will be quickly memorized.

In order to hold the charts upon the frame, the latter is provided at its opposite ends with guides 28 which receive the opposite edges of the charts, while the bars 13 provide a rest for the lower edges of the charts. A pivoted bail 28' is provided at the top of the frame and is adapted to be swung downward upon the chart so that the latter will be securely held in place.

Any number of the charts may be provided and they may be easily and quickly removed and replaced so that the various scales may be taught.

In addition to the means just described, the invention also aims to provide means for locking all of the keys of the piano except those keys the student desired to play. In other words, if the student is practising the scale in A sharp minor, all of the keys of the piano will be locked except those keys used in playing this particular scale. This is accomplished through the medium of movable locking bars 29 and 30, the former being used to lock all of the unused keys of the major scale and the latter for the purpose of locking the unused keys of the harmonic minor scale. These locking bars each includes spaced lugs 31 which are adapted to be moved into position directly beneath the keys to be locked so as to prevent the depression of these keys, the lugs being so spaced as to provide for the depression of the keys used in playing a particular scale. The bars 29 and 30 operate in guides 32 and the bar 29 has extending therefrom a finger 33, whose lower end has a sliding engagement with an indicator bar 34 which is mounted for sliding movement beneath the bottom of the piano as shown at 35. This indicator bar carries a pointer 36 which cooperates with an indicating chart 37 located upon the front of the piano. By moving the indicator bar, the locking bar 29 will be moved so that when the pointer 36 is positioned at the proper place upon the chart 37, the locking bar 29 will be arranged so that the lugs will be positioned directly beneath all of the keys to be locked. For the purpose of moving the locking bar into active position there is provided a slide 38 which is movable longitudinally beneath the bottom of the piano in a guide 39 and which is provided with a cam portion 40 for engagement with a roller carried at the lower end of a bracket 41 secured to and depending from the bar 29. By moving the slide 38 in one direction, the roller will be caused to ride upon the cam 40 whereupon the bar 29 will be elevated to bring the lugs into proper position to prevent the depression of the keys not used in playing the scale indicated upon the chart 37.

The locking bar 30 is also provided with a depending finger 42 which has a sliding engagement with an indicator bar 43, while the latter is provided with a pointer 44 which is adapted to be positioned upon the indicator chart to position the bar 30 with respect to the keys of the minor scale so that the said keys may be locked. For this purpose there is provided a slide 45 which operates in the guide 39 and which is provided with a cam 46 to engage a roller at the lower end of a bracket 47 which is carried by the locking bar 30. Thus after the pointer 44 has been positioned, the slide 45 may be moved to elevate the bar 30 to locking position.

Only one set of keys may be locked at a time so that when the keys of the major scale are locked, they must be released before locking the keys of a minor scale.

The invention is susceptible of various changes in its form, proportions and minor details of construction and the right is herein reserved to make such changes as properly fall within the scope of the appended claims.

Having described the invention what is claimed is:—

1. The combination with a piano keyboard, of a plurality of reversible movable indicia carrying elements associated with the keys and means whereby operation of a particular key will operate the indicia carrying elements to indicate the key note and the position of the said note upon the staff.

2. The combination with a piano keyboard, of a plurality of vertically reversible movable indicia carrying elements associated with the keys and means whereby operation of a particular key will operate the indicia carrying elements to indicate the key note and the position of said note upon the staff.

3. The combination with a piano keyboard, of reversible means removably mounted upon the keyboard above the keys for indicating the position upon the staff of a note corresponding to a selected key.

4. The combination with a piano keyboard, of a plurality of charts and reversible means associated with the keys and operated thereby to indicate the position upon the staff of a note corresponding to a selected key.

5. The combination with a piano keyboard, of a plurality of charts having openings therein and vertically movable strips positioned behind the chart and arranged for independent operation by the keys and indicia upon the strips, whereby the name of a selected key and the position upon the staff of its corresponding note will appear within the openings of the chart.

6. The combination with a piano keyboard, of selective means associated therewith for locking certain of the keys and means associated with the keyboard for indicating upon the musical staff the position of the notes played by the remaining keys.

7. The combination with a piano, of a plurality of charts representing musical scales, means associated with the keys of the piano for indicating upon the charts the position of the notes of the scale played, selective means whereby all of the keys except the keys of the particular scale indicated may be locked against movement and means for controlling the selective locking means.

8. The combination with a piano, of a normally inactive strip for locking the keys against movement, means for selectively positioning the strips for engagement with certain of the keys and means for moving the strips into locking position.

9. The combination with a piano, of a plurality of normally inactive strips for locking the keys against movement, means associated with each strip for selectively positioning the latter for engagement with certain of the keys and means for moving the position of the strip into locking position.

In testimony whereof I affix my signature.

JOSEPH H. WILLIAMS.